Aug. 8, 1950          C. E. WILSON          2,518,411

DUAL ACTION SAFETY BRAKE

Filed Dec. 18, 1947          2 Sheets-Sheet 1

Corbitt E. Wilson
INVENTOR.

BY *Clarence A. O'Brien*
*and Harvey B. Jacobson*
Attorneys

Aug. 8, 1950     C. E. WILSON     2,518,411
DUAL ACTION SAFETY BRAKE
Filed Dec. 18, 1947     2 Sheets-Sheet 2
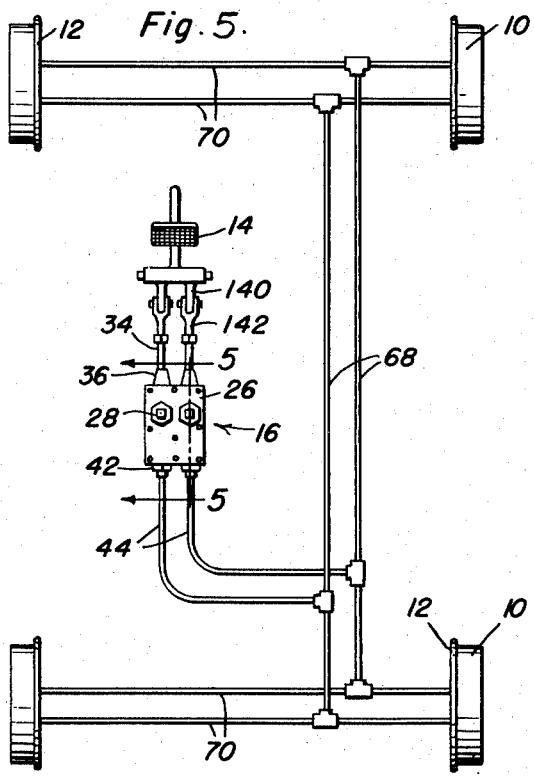
Corbitt E. Wilson
INVENTOR.

Patented Aug. 8, 1950

2,518,411

UNITED STATES PATENT OFFICE 2,518,411

DUAL ACTION SAFETY BRAKE

Corbitt E. Wilson, Spartanburg, S. C.

Application December 18, 1947, Serial No. 792,367

3 Claims. (Cl. 188—78)

This invention relates generally to braking systems, and more particularly to a brake system for automotive vehicles, in which brake action is applied to a plurality of wheels simultaneously.

A primary object of this invention is to provide a brake system which is of dual character with a view to increasing the safety with which automotive vehicles may be operated, the second half of the system being essentially a duplication of the other half, and each of the halves or parts of the system operating independently of the other, so that failure of one will not incapacitate the brake system.

Another object of this invention is to provide a brake system of the character mentioned above and which may have incorporated therewith a manual control operating mechanically and without reference to the hydraulic system which is depended upon for the "service" operation of the brake system.

An object of specific character is to provide a brake system for an automotive vehicle in which a pair of cylinders with pistons are operated by a brake pedal, each of these cylinders being connected to a corresponding cylinder carried on the brake drum or brake plate at each wheel, so that two independent hydraulic braking systems are provided.

Another specific object is to provide novel lever and cam means at each wheel, these lever and cam means being operatively connected with brake shoes which are divided into two halves, the halves being of expanding type and arranged in full floating opposed relation within the brake drums, the adjacent ends of the halves of the brake shoes being interfitted in a novel manner.

Yet another object of this invention is to provide means whereby a dual system of brakes for automotive vehicles is provided with means for individual adjustment of the two halves of each brake assembly at the wheel, together with means for individual adjustment of what will be hereinafter referred to as the master cylinders and pistons assembly.

And a last object to be specifically mentioned is to provide a device of this character which is relatively inexpensive and practicable to manufacture, which is simple, safe and completely convenient to install, service and use, and which will give generally efficient and durable service.

With these objects definitely in view, this invention resides in certain novel features of construction, combination and arrangement of elements and portions as will be hereinafter described in the specification, particularly pointed out in the appended claims, and illustrated in the accompanying drawings which form a material part of this application, and in which:

Figure 1:
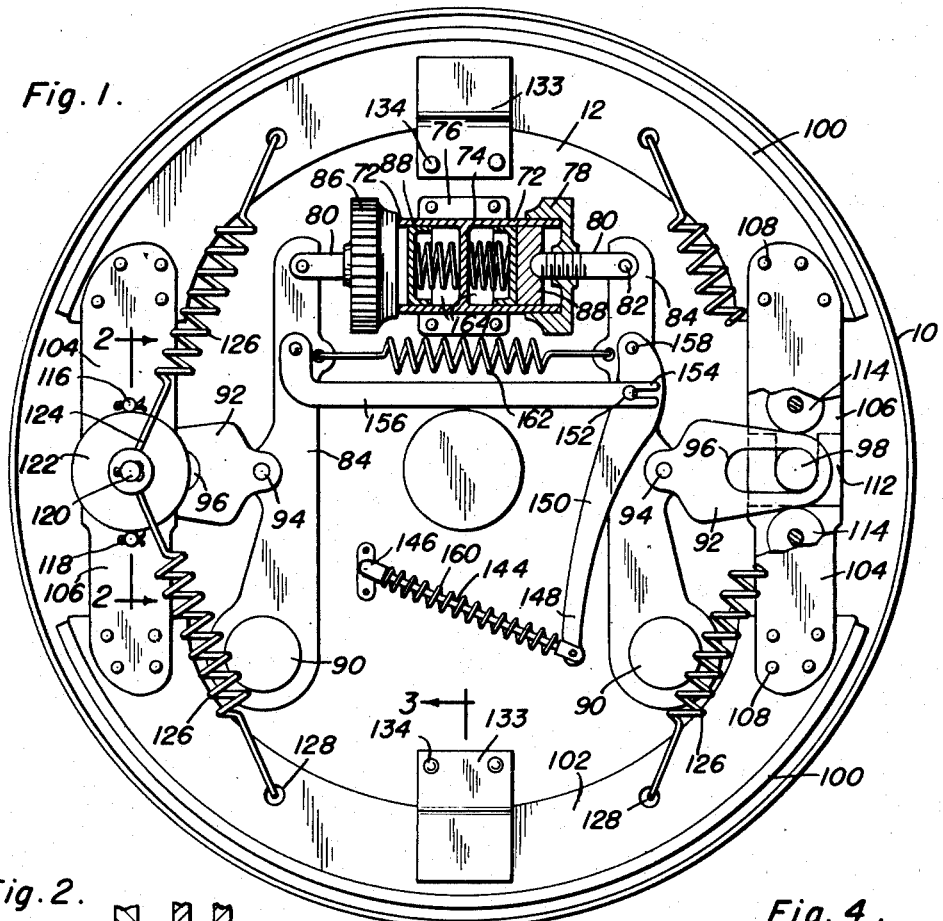
Figure 1 is an elevational view of the assembly at each wheel, portions of the structure being broken away and the underlying portions shown in elevation and in section, to facilitate the illustration and to amplify the disclosure of this invention.
Figure 4:
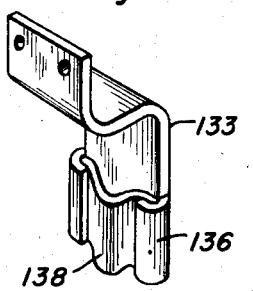

Figure 4 is a three dimensional view of the clip assembly used to assist in retaining the shoes in floating relation on the brake drum plate; and Figure 5 is a diagrammatic assembly view designed to illustrate a general arrangement of the master cylinder assembly, operating means therefore, and communicating hydraulic pipe lines leading from each individual cylinder of the master cylinder assembly to each wheel, it being understood that a pair of cylinders are incorporated with each wheel assembly, as well illustrated in Figure 1.

Like characters of reference designate similar or identical elements and portions throughout the specification and throughout the several views of the drawings.

Referring now to the drawings in detail, this invention is adapted to be used with an environment including an automotive vehicle having ground contacting wheels equipped with brake drums 10 having brake plate portions 12, a brake pedal 14, and a complement of parts not directly related to the subject matter of this disclosure.

This invention includes a master cylinder assembly, indicated generally at 16 closed by a common cap plate 26 having filler plugs 28.

The actuating rod 34 is supported in simple bearing apertures in frustoconical cap structure 36 carried by the master cylinder block.

The opposite end of each cylinder is closed by a screwed fitting 42 which is connected in any suitable manner to one of the hydraulic pipes 44, this fitting being best illustrated in Figures 5.

The pipes 44, as best illustrated in Figure 5, lead individually to other pipes 68 and 70 to pairs of opposed cylinders 72, separated by a partition 74 and mounted on suitable attachment plates 76 and brake plates 12 at each wheel. The caps 78 on the other ends of the cylinders 72 are adapted to slide thereon and are threaded to receive threaded pins 80 which are bifurcated at their outer ends for pivotal connection, as at 82 with the levers 84. It will be noted that the caps 78 are notched peripherally at 86 and the plate 12 will be suitably apertured to allow these caps to be turned, as by the use of a screwdriver, from the remote side of the plate 12. This adjustment will allow variation of the positioning of the caps relative to the cylinder 72, so that the action of the pistons 88 may be adjusted according to conventional practice.

Figure 2:
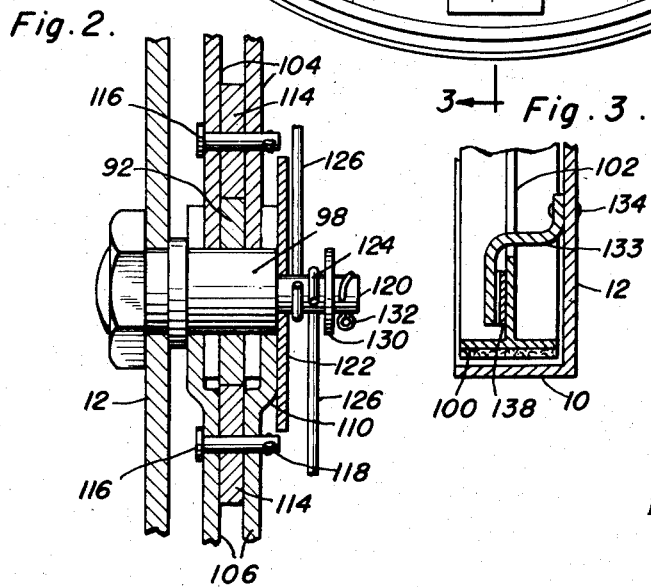
Figure 2 is an enlarged vertical sectional view, taken on the line 2—2 in Figure 1.
Figure 3:
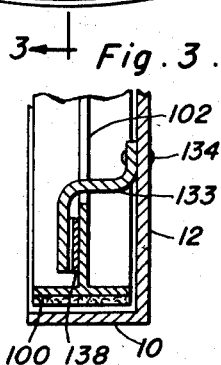
Figure 3 is another fragmentary sectional view, taken on the line 3—3 in Figure 1.

Each of the levers 84 are pivoted as at 90 on the plate 12 and cuneiform cams 92 are pivotally connected at 94 to intermediate portions of the levers 84, and these cams are longitudinally recessed at 96 to receive fixed cam guide pins 98 carried by the plate 12. A pair of brake shoes 100 having webs 102, are provided in each brake drum, the ends of the webs having interfitting pairs of plates 104 and 106 rigidly secured thereon as by rivets 108. It should be carefully noted that the plates 106 are offset, as at 110, and straddle the ends of the plates 104, as best illustrated in Figure 2, and that all these plates are terminally bifurcated to straddle the cam guiding pins 98, as indicated by the dash lines 112 in Figure 1.

A roller 114 is carried between the plates 104 and 106 at each end of each brake shoe, these rollers being simply mounted for free rotation on pins 116 held in place by cotter pins 118, the rollers being, of course, mounted between adjacent portions of the pairs of plates 104 and 106 so that these rollers engage the inclined faces of the cam 92. The cam guide pin 98 may be extended as at 120 and a friction plate washer 122 may be placed on each of these extending portions 120 to prevent undue friction between the outermost of the plates 106 and terminals 124 of springs 126 which are secured to the said extending portions 120, the other ends of these springs being secured, as indicated at 128 to the webs 102 of the brake shoes in order to urge the brake shoes into inoperative positions. Another washer 130, retained by the cotter pin 132 may be used to prevent the looped ends 124 of these springs from disengagement from the said extending portion 120.

While the pins of the brake shoes are held reasonably securely in position by the interfitting of the ends of the plates 104 and 106, co-acting with the fixed pins 98, for further retention of the brake shoes there are provided offset bracket members 133 secured to the plate 12 as at 134 and having turned lug portions 136 to receive lateral edges of resilient plate contact members 138 which are sprung into place between the lugs 136, as best illustrated in Figure 4, and are adapted to frictionally engage one side of the web 102 of each brake shoe.

Referring again to Figure 5, it will be noted that the brake pedal 14 is provided with two apertured lugs 140 which carry a pair of bifurcated links 142 pivotally secured on these lugs and adjustably secured to the actuating rods 34. This construction completes that portion of the invention operated by the foot pedal 14, and ordinarily referred to as the service brakes. An emergency hand brake system may be incorporated with this invention and is illustrated in Figure 1. This emergency hand brake system includes a flexible cable 144 which will extend from any suitable manual control member to the plate 12 and a suitable cable guide 146 secured thereon, for attachment to the lower end 148 of the lever 150 which is pivoted by means of a transverse pin 152 on the bifurcated end 154 of a non-flexible spacer member 156, the other end of which is pivoted on one of the levers 84, while the other end of the lever 148 is pivoted at 158 to the other lever 84. A spring 160 is compressed between the lower end 148 of the lever 150 and the cable guide 146 to urge the lever 150 in one direction and a spring 162 is secured under tension between portions of the levers 84 between the pivot pins 94 and 82 to urge the levers 84 in the opposite direction.

The operation of this invention will be clearly understood from the foregoing description of the mechanical details thereof, taken in connection with the above recitation of the objects sought to be achieved by this invention. In recapitulation, pressure applied to the brake pedal 14 will cause both actuating rods 34 to move the pistons 30 so as to drive hydraulic fluid from the master cylinder 16 through the pipes 44 and connecting pipes to the cylinders 72, thus forcing fluid into the chambers 164 between the partition 74 and the pistons 88. Both these pistons are simultaneously moved to pivot the levers 84 about their pivotal attachment pins 90 and to force the cams 92 in a direction causing the rollers 114, plates 104 and 106, and the brake shoes 100 into engagement with the brake drum 10. Upon release of pressure the spring 162 retracts the pistons 88 and forces fluid from the connecting pipes between the valve bushing 48 and the contiguous portion of the fitting 42, until such time as the pressure is reduced to a predetermined limit which can be adjusted to individual requirements. The hand operated lever 150 has been fully explained and described in relation to the service brakes.

Obviously many minor variations may be made in the details of construction in proportionment with the various elements of this invention without departure from the spirit and scope thereof and the drawings particularly should be thought of as illustrative rather than limiting. It will be clear that all the objects recited above are amply achieved by this invention and that the above referred to modification may merely reside in adapting the invention to particular applications. Accordingly this invention should be thought of as limited only by a proper interpretation of the subjoined claims.

Having described the invention, what is claimed as new is:

1. In a wheel brake, a pair of complementary spring biased brake shoes having web portions, pairs of spaced plates rigidly secured to the web portions, and said plates including outer pairs of plates straddling inner pairs of plates, pairs of oppositely disposed rollers, one roller being carried by each outer pairs of plates and another roller being carried by each inner pair of plates, and a cam operatively mounted between each pair of rollers and between the inner pair of plates.

2. In a wheel brake, a pair of complementary spring biased brake shoes having web portions, pairs of spaced plates rigidly secured to the web portions, and said plates including outer pairs of plates straddling inner pairs of plates, pairs of oppositely disposed rollers, one roller being carried by each outer pair of plates and another roller being carried by each inner pair of plates, and a cam operatively mounted between each pair of rollers and between the inner pair of plates, a cam guide pin secured on adjacent fixed structure and extending between each pair of rollers, said cams having longitudinally disposed recesses to receive said guide pins.

3. In a wheel brake, a pair of complementary spring biased brake shoes having web portions, pairs of spaced plates rigidly secured to the web portions, and said plates including outer pairs of plates straddling inner pairs of plates, pairs of oppositely disposed rollers, one roller being carried by each outer pair of plates and another roller being carried by each inner pair of plates, and a cam operatively mounted between each pair of rollers and between the inner pair of plates, a cam guide pin secured on adjacent fixed structure and extending between each pair of rollers, said cams having longitudinally disposed recesses to receive said guide pins, said plates being terminally bifurcated to straddle the guide pins, and said rollers and cams being of the same thickness.

CORBITT E. WILSON.

REFERENCES CITED

The following references are of record in the file of this patent:

UNITED STATES PATENTS

| Number | Name | Date |
| --- | --- | --- |
| 1,630,178 | Harrington | May 24, 1927 |
| 2,087,371 | Chambers | July 20, 1937 |
| 2,185,324 | Baisch | Jan. 2, 1940 |
| 2,209,343 | Masteller | July 30, 1940 |
| 2,256,721 | Martin | Sept. 23, 1941 |

FOREIGN PATENTS

| Number | Country | Date |
| --- | --- | --- |
| 377,478 | Great Britain | July 28, 1932 |